C. TASSO AND H. B. DALY.
GASKET.
APPLICATION FILED JUNE 6, 1919.
1,424,691.
Patented Aug. 1, 1922.
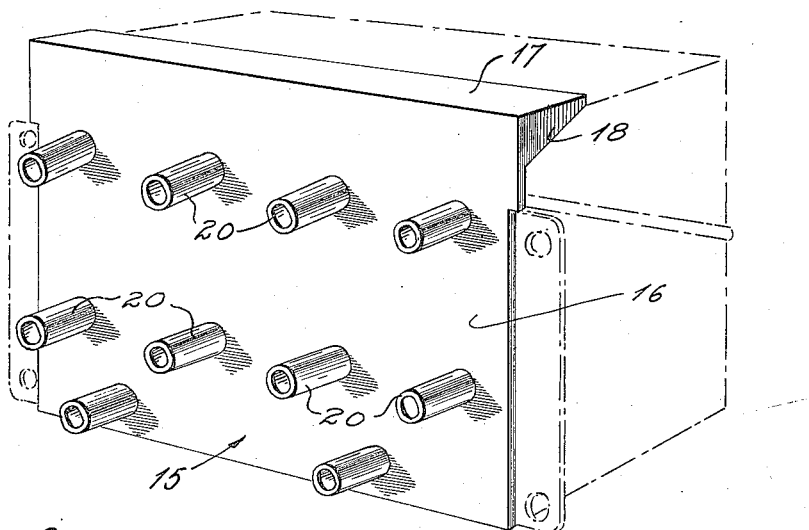
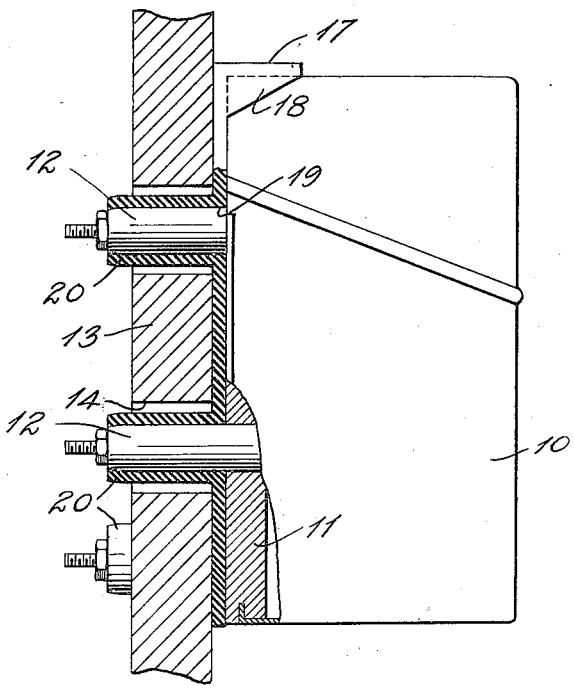
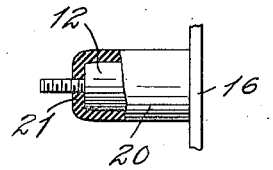
INVENTOR.
BY Charles Tasso and
Hubert B. Daly
Victor J. Evans
ATTORNEY.

UNITED STATES PATENT OFFICE.

CHARLES TASSO AND HUBERT B. DALY, OF NEW YORK, N. Y.

GASKET.

1,424,691.  Specification of Letters Patent.  Patented Aug. 1, 1922.

Application filed June 6, 1919. Serial No. 302,364.

*To all whom it may concern:*

Be it known that we, CHARLES TASSO and HUBERT B. DALY, citizens of United States, residing at New York, in the county of New York and State of New York, have invented new and useful Improvements in Gaskets, of which the following is a specification.

This invention relates to improvements in attachments for motor vehicles and is particularly adapted for use as a gasket between the dash board of a vehicle and the coil box.

The principal object of the invention resides in the provision of a device designed particularly for use on Ford automobiles to exclude water and moisture from the coil box in order to overcome many of the ignition troubles frequently experienced after a car has been exposed to the elements.

It has been our experience that frequently water will gather in the apertures formed in the dash board through which the high tension cables are carried, and, immediately upon starting the motor, the water will be blown through said apertures and against the wooden back of the coil box thereby rendering the same readily conductive of electrical current and thus interfering with the proper functioning of the various parts. In order to overcome these objectionable features we provide a gasket which is arranged to completely cover the back of the coil box in order to protect the same from any moisture and prevent short circuiting of the device.

With the above and other objects in view as will become apparent as a description proceeds, the invention consists in the novel construction, combination and arrangement of parts as will be fully set forth in the following specification, claimed and illustrated in the accompanying drawings in which:

Figure 1 is a perspective view of this improved gasket illustrating the coil box in broken lines.

Figure 2 is a vertical sectional view through a portion of the dash board and a part of the gasket illustrating the details of construction, a portion of the coil box being broken away to more clearly illustrate the device, and Figure 3 is a fragmentary view partly in section of a modified form of the invention.

Referring to the drawings in detail the numeral 10 designates a coil box having the usual wooden rear wall 11 through which the high tension insulators 12 extend. The low tension insulators are arranged slightly below the lowermost high tension insulators and these insulators are of a length sufficient to project well beyond the inner face of the dash board 13. It will be understood that this dash board is provided with apertures 14 for the accommodation of the insulators.

The gasket or attachment is designated generally by the numeral 15 and comprises a body 16 preferably of soft rubber or other similar compressible water proof material. The upper edge of the body 16 is provided with a longitudinal angularly extended flange 17 which is formed at opposite ends with substantially triangular webs 18 which partially overlie the ends of the coil box cover. Formed in the body 16 at spaced intervals and in proper position to receive the insulators 12 are apertures 19 as clearly illustrated in Figure 2. Tubular nipples or extensions 20 project from the outer face of the body 16 and are adapted to frictionally engage with the insulators 12 as clearly shown in the drawings. The nipples 20 are preferably of a length equal to the length of the insulators but it is to be understood that if so desired each nipple may be provided with an in-turned flange 21 to overlie the outer end of its respective insulator in the manner illustrated in Figure 3.

In operation it will be seen that the gasket is placed on the coil box in the manner illustrated in Figures 1 and 2 and the coil box may then be placed on the dash board and secured thereto in the usual manner with the insulators and nipples 20 extending through the openings 14. Any accumulation of water or moisture in the openings 14 will be prevented from injuring the wall 11 of the coil box 10 and said wall will be protected at all times thus insuring the proper functioning of the various elements and avoiding any possibility of short circuiting the high tension current.

While in the foregoing has been shown and described the preferred form of this invention it is to be understood that certain minor changes and construction, combination and arrangement of parts may be resorted to without departing from the spirit and the scope of the invention as claimed.

What is claimed as new is:

1. The combination with a motor vehicle having an apertured dash board, a coil box and insulators extending from the coil box through the apertures in the dash board, of a gasket comprising a relatively soft yielding body of water proof material adapted to be interposed between the dash board and coil box, said body being provided with apertures to receive the insulators and nipples on the front face of the gasket adapted to fit snugly about the insulators, and a flange at the upper edge of the gasket to partially overlie the top of the coil box.

2. The combination with a motor vehicle having an apertured dash board, a coil box and insulators extending from the coil box through the apertures in the dash board, of a gasket comprising a relatively soft yielding body of water proof material adapted to be interposed between the dash board and coil box, said body being provided with apertures to receive the insulators and nipples on the front face of the gasket adapted to fit snugly about the insulators, and flanges at the outer ends of the nipples adapted to enclose the outer ends of the insulators.

3. As a new article of manufacture, a sealing gasket comprising a body of water proof material adapted to be interposed between the coil box and the dash board and provided with apertures therein through which the insulators of the coil box are adapted to be received, the walls of the apertures adapted to yieldingly and snugly embrace the insulators at the points of connection of the insulators with the box, and an angularly disposed flange formed integrally with said body and adapted to overlie a portion of the top of the box, as and for the purpose specified.

4. As a new article of manufacture, a sealing gasket comprising a body of water proof material adapted to be interposed between the coil box and the dash board and provided with apertures therein through which the insulators of the coil box are adapted to be received, the walls of the apertures adapted to yieldingly and sungly embrace the insulators at the points of connection of the insulators with the box, an angularly disposed flange formed integrally with said body and adapted to overlie a portion of the top of the box, and connecting webs between said flange and the body portion of the gasket and adapted to embrace portions of the sides of the box.

In testimony whereof we affix our signatures.

CHARLES TASSO.
HUBERT B. DALY.